3,523,931
METAL FREE LUBRICANT ADDITIVES

Eric Simon Forbes, Woking, John Mansel Squire, Thorpe, and John Michael Wood, Ashford, England, assignors to The British Petroleum Company Limited, London, England, a corporation of England
No Drawing. Filed Sept. 7, 1966, Ser. No. 577,605
Claims priority, application Great Britain, Sept. 15, 1965, 39,354/65
Int. Cl. C08f 7/12
U.S. Cl. 260—88.1                        6 Claims

ABSTRACT OF THE DISCLOSURE

N-vinyl pyrrolidone is copolymerized with an alpha olefin having from two to twenty carbon atoms in the presence of a Friedel-Crafts catalyst and at a temperature within the range of −60° C. to +50° C. The copolymer obtained is suitable for use as a lubricating oil additive.

---

This invention relates to metal-free additives for improving the detergent/dispersant properties and viscosity index of lubricating oils and to lubricating compositions containing such additives.

Most motor vehicles spend a large part of their lives operating under light duty conditions in which the crankcase lubricant may not reach or stay for long at the optimum operating temperature. These conditions tend to cause the formation of an insoluble sludge in the oil consisting of water, partial oxidation products of the oil and fuel, corrosion and wear products and dirt. This "low-temperature sludge" as it is sometimes called may deposit on various operating parts of the engine and can cause inefficient engine operation and possibly malfunctioning.

It is known to incorporate various metal-containing organic compounds, such as metal sulphonates or phenates, in lubricating oils for the purpose of maintaining insoluble contaminants in suspension but these metal-containing additives are not particularly effective in dispersing low temperature sludge and they also tend to form ash-like deposits which also can lower the performance of the engine. Recently various metal-free dispersant additives have been proposed for combating the problem of low-temperature sludge deposition. These additives include certain polyalkenyl succinimides and certain co-polymers of vinyl pyrrolidones with alkyl acrylates and methacrylates. Because of their polymeric nature, some of these latter additives also possess VI-improving properties.

We have now discovered a new class of metal-free polymeric compounds that are effective for improving the detergent/dispersant properties and the viscosity index of lubricating oils. The new compounds are particularly effective in retarding the formation of low temperature sludge and in dispersing it when it is formed.

According to the invention there is provided a method of preparing a metal-free co-polymer, suitable for use as a lubricating oil additive, wherein N-vinyl pyrrolidone is co-polymerised with an alpha olefin having from two to twenty carbon atoms in the presence of a Friedel-Crafts catalyst and at a temperature within the range from −60° C. to +50° C.

Suitable Friedel-Crafts catalysts includ aluminium chloride, zinc chloride, antimony chloride, ferric chloride, stannic chloride, titanium chloride, boron trifluoride and hydrogen fluoride or mixtures of two or more of these, for example, a mixture of aluminium chloride and titanium tetrachloride. The amount of catalyst used is not critical but is most suitably within the range from 2.5 to 50% wt. based on the total weight of monomer reactants.

Particularly suitable alpha olefins are those having from four to nine carbon atoms especially the methyl-substituted propenes, butenes, pentenes and hexenes, for example, isobutene, 3-methylpentene-1 and 4-methylpentene-1.

The proportion of N-vinyl pyrrolidone in the monomer reactants is preferably from 5 to 60% on a molar basis. The amount that actually enters into true co-polymerisation with the olefin will usually be less than the amount initially present in the reactants as the N-vinyl pyrrolidone usually reacts more slowly than the olefin. Any unreacted monomers and any homo-polymer of N-vinyl pyrrolidone will be removed when the co-polymer product is isolated but the latter may also contain some homo-polymer of the olefin so the expression "co-polymer" when used in this specification is to be construed in this light.

The polymerisation reaction is normally carried out in an inert atmosphere and in the presence of a solvent as is usual with reactions of this type. Suitable solvents include hydrocarbon solvents (for example, n-heptane), halogenated hydrogen solvents (for example ethyl and methyl chlorides and bromides, 1:1-dichloroethane and 1:2-dichloroethane) and liquid sulphur dioxide. The reaction is usually complete in about 1–6 hours depending mainly on the reaction temperature. The polymer is recovered by conventional chemical techniques, for example, by washing with water, centrifuging to remove catalyst and distilling off the solvent under reduced pressure.

The limiting viscosity number (LVN) of the co-polymer will usually be within the range from 0.1 to 1.5 depending mainly on the temperature of the reaction. Polymers of high LVN have greater thickening power and greater viscosity index improving effect when added to lubricating oils than polymers of low LVN but low LVN polymers are more shear stable. In the polymerisation reactions, higher temperature will in general result in polymers of lower LVN and vice versa.

The invention also includes co-polymers of N-vinyl pyrrolidone and alpha olefins having from 2 to 20 carbon atoms whenever prepared as described above.

The invention further includes lubricating compositions comprising a mineral or synthetic lubricating base oil having dissolved therein a minor proportion, for example, from 0.1 to 15% by weight of the composition, of a co-polymer as specified above.

EXAMPLES

The preparation of four co-polymers according to the invention and their use in lubricating compositions will now be described in more detail by way of example.

Co-polymer CP-173

Powdered anhydrous aluminium chloride (10 g.) was added to a mixture of freshly distilled N-vinyl pyrrolidone (10 ml.), 4-methylpentene-1 (90 ml.) and ethyl bromide (100 ml.). The mixture was stirred for four hours under dry nitrogen and the reaction temperature was maintained at 0° C. by an external cooling bath. The mixture was then diluted with n-heptane (200 ml.) and washed three times with 200 ml. portions of water. The heptane layer was centrifuged to remove solid catalyst residues, and the heptane solvent was removed in a vacuum oven at 60° C. and 20 mm. Hg. The weight of product recovered was 55 g. (78% of the theoretical amount). The nitrogen content of the co-polymer was 0.12% wt. indicating that the N-vinyl pyrrolidone content was 0.95% wt.

Co-polymer CP 172

The procedure used for CP–173 was repeated with the following reaction mixture.

Ethyl bromide—100 ml.
N-vinyl pyrrolidone—40 ml.
4-methylpentene-1—60 ml.
Aluminium chloride—10 g.

The amount of heptane-soluble product obtained was 12 g. (15% of the theoretical amount). The nitrogen content of the product was 0.58% wt. indicating that the N-vinyl pyrrolidone content in the co-polymer was 4.6% wt.

Co-polymer CP–180

The procedure used for CP–173 was repeated with the following reaction mixture:

1:2-dichloroethane—100 ml.
N-vinyl pyrrolidone—40 ml.
4-methylpentene-1—60 ml.
Aluminium chloride—10 g.

The amount of heptane-soluble product obtained was 19.3 g. (25% of the theoretical amount). The nitrogen content of the product was 1.71% wt. indicating that the N-vinyl pyrrolidone content of the co-polymer was 13% wt.

Co-polymer CP–181

The procedure used for CP–173 was repeated with the following reactants:

Ethylbromide—100 ml.
N-vinyl pyrrolidone—40 ml.
4-methylpentene-1—60 ml.
Aluminium chloride—20 g.

The amount of heptane-soluble product obtained was 24.2 g. (33% of the theoretical amount). The nitrogen content of the product was 0.92 indicating that the N-vinyl pyrrolidone content of the co-polymer was 7.7% wt.

Co-polymers of CP–172, CP–173, CP–180 and CP–181 were blended into a refined petroleum lubricating oil having a viscosity of 6.50 cs. at 210° F. and a viscosity index of 103. The base oil and the blends containing the co-polymers were assessed in a laboratory bench test that has been developed by Sinclair Research, Inc., for testing the low temperature detergency of lubricating oils. The test is fully described in U.S. patent specification 3,044,860.

In the tests, 85 g. of the oil or oil blend plus 15 g. of a sludge precursor material were subjected to a mixture of nitric oxide (0.3 litre/hour), oxygen (3.0 litres/hr.) and nitrogen (6.7 litres/hr.) at 100° C. in a test tube for six hours. The precursor material was obtained by oxidation of a heavy cat-cracked gasoline fraction (B.P. 300–400° F.) and had an acid number of 11.3 mg. KOH/g. After six hours, the nitric oxide and oxygen flows were stopped and the nitrogen flow was continued for a further half hour. After standing for 24 hours at room temperature, the oil was decanted off and the tube was rinsed with n-pentane. Adhering deposits were rated visually (100=optimum). The n-pentane insolubles content of the decanted oil was determined and the sludge in the tube was weighed after washing with n-pentane. The dispersancy level of the oil was calculated as $$\frac{\text{n-Pentane insolubles content of decanted oil}}{\text{Total weight of sludge formed in test}} \times 100\%$$

Inhibition of sludge formation was calculated from results obtained for testing the base oil alone.

$$\text{Inhibition} = \frac{\begin{pmatrix}\text{total wt. sludge formed} \\ \text{in base oil test}\end{pmatrix} - \begin{pmatrix}\text{total wt. sludge formed} \\ \text{in additive oil test}\end{pmatrix}}{\text{total wt. sludge formed in base oil test}} \times 100\%$$

The results of the tests are given in Table 1.

TABLE 1

| | Visual rating | Dispersancy percent | Inhibition percent |
|---|---|---|---|
| Base oil | 37 | 36 | |
| Base oil +2.5% wt. CP–172 | 80 | 83 | 17 |
| Base oil +2.5% wt. CP–173 | 72 | 79 | 28 |
| Base oil +2.5% wt. CP–180 | 81 | 83 | −19 |
| Base oil +2.5% wt. CP–181 | 81 | 85 | 6 |

Viscosity and viscosity index determinations were also made on the blends and the results are shown in Table 2.

TABLE 2

| | Base oil | Base oil plus— | | | |
|---|---|---|---|---|---|
| | | 4% CPC–173 | 4% CPC–172 | 4% CPC–181 | 4% CPC–180 |
| $KV_{210°\ F.}$ cs | 6.54 | 12.43 | 10.55 | 9.98 | 11.31 |
| $KV_{140°\ F.}$ cs | 18.84 | 37.61 | 31.60 | 30.08 | 34.36 |
| $KV_{100°\ F.}$ cs | 45.60 | 94.58 | 79.22 | 75.47 | 86.47 |
| VI | 103 | 125 | 121 | 119 | 122 |

We claim:
1. A method of preparing a co-polymer, suitable for use as a lubricating oil additive, wherein N-vinyl pyrrolidone is co-polymerised with an alpha olefin having two to twenty carbon atoms in the presence of a Friedel-Crafts catalyst and at a temperature within the range from −60° C. to +50° C.

2. A method of preparing a co-polymer, suitable for use as a lubricating oil additive, wherein from 5 to 60 mole percent, based on the monomer reactants, of N-vinyl pyrrolidone is co-polymerised with an alpha olefin having from two to twenty carbon atoms in the presence of a Friedel-Crafts catalyst and at a temperature within the range from −60° to +50° C.

3. A method of preparing a co-polymer, suitable for use as a lubricating oil additive, wherein from 5 to 60 mole percent, based on the monomer reactants, of N-vinyl pyrrolidone is co-polymerised with an alpha olefin having from four to nine carbon atoms in the presence of a Friedel-Crafts catalyst and at a temperature within the range from −60° to +50° C.

4. A method of preparing a co-polymer, suitable for use as a lubricating oil additive, wherein from 5 to 60 mole percent, based on the monomer reactants, of N-vinyl pyrrolidone is co-polymerised with a methyl-substituted propene, butene, pentene or hexene in the presence of a Friedel-Crafts catalyst and at a temperature within the range from −60° to +50° C.

5. A method of preparing a co-polymer, suitable for use as a lubricating oil additive, wherein from 5 to 60 mole percent, based on the monomer reactants, of N-vinyl pyrrolidone is co-polymerised with 4-methylpentene-1 in the presence of a Friedel-Crafts catalyst and at a temperature within the range from −60° to +50° C.

6. A method as claimed in claim 5, wherein the amount of catalyst used is from 2.5 to 50% by weight based on the total weight of monomer reactants.

References Cited

UNITED STATES PATENTS 2,970,133   1/1961   Sistrunk _____ 260—93.7
3,162,625   12/1964  Luberoff _____ 260—88.3
3,256,364   6/1966   Bryant et al. _____ 260—895

JOSEPH L. SCHOFER, Primary Examiner

J. C. HAIGHT, Assistant Examiner

U.S. Cl. X.R.

252—51.5; 260—88.3